US012737521B2

(12) United States Patent
Chen et al.

(10) Patent No.: US 12,737,521 B2
(45) Date of Patent: Sep. 15, 2026

(54) DYNAMIC POWER LOAD LINE BY CONFIGURATION

(71) Applicant: Altera Corporation, San Jose, CA (US)

(72) Inventors: Guang Chen, Fremont, CA (US); Yuet Li, Fremont, CA (US); Archanna Srinivasan, San Jose, CA (US)

(73) Assignee: Altera Corporation, San Jose, CA (US)

( * ) Notice: Subject to any disclaimer, the term of this patent is extended or adjusted under 35 U.S.C. 154(b) by 322 days.

(21) Appl. No.: 17/856,776

(22) Filed: Jul. 1, 2022

(65) Prior Publication Data

US 2022/0335190 A1 Oct. 20, 2022

(51) Int. Cl.
*G06F 30/347* (2020.01)
*G06F 119/06* (2020.01)

(52) U.S. Cl.
CPC ........ *G06F 30/347* (2020.01); *G06F 2119/06* (2020.01)

(58) Field of Classification Search
CPC .... G06F 30/347; G06F 2119/06; G06F 30/36; G06F 30/343
See application file for complete search history.

(56) References Cited

U.S. PATENT DOCUMENTS 6,130,842 A * 10/2000 Lacey ................ H03K 19/1778 365/201
10,615,802 B2 * 4/2020 Betz ................. H03K 19/17784
2009/0249092 A1 * 10/2009 Lam ........................ G06F 1/266 713/300
2022/0114316 A1 * 4/2022 Li ......................... G06F 30/343
2022/0116041 A1 * 4/2022 Kumashikar ....... H04L 41/0833
2022/0121259 A1 * 4/2022 Peng .................. G06F 13/4022

* cited by examiner

*Primary Examiner* — Jack Chiang
*Assistant Examiner* — Brandon Bowers
(74) *Attorney, Agent, or Firm* — Fletcher Yoder, P.C.

(57) ABSTRACT

Systems or methods of the present disclosure may provide for determining a load line for operation of a programmable logic fabric where the load line is based at least in part on design configuration details for a design or a configuration rather for generic deployment of the programmable logic device. The load line may be determined using software modeling for the design or configuration. Additionally or alternatively, the load line may be determined using runtime testing and sensing of real-world parameters. This determination based on real-world parameters of a deployment of the configuration or design is based on a determination of a step load for the design or configuration.

19 Claims, 7 Drawing Sheets

132
ΔV
112
I
104
134
110
102
108
106
132
138
136
122
64
140
144
142
V
VNORM
VNORM'
64
VMIN
130

DYNAMIC POWER LOAD LINE BY CONFIGURATION

BACKGROUND

The present disclosure relates generally to integrated circuit (IC) devices such as programmable logic devices (PLDs). More particularly, the present disclosure relates to techniques for load lines for an integrated circuit device, such as a field programmable gate array (FPGA).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Integrated circuit devices are found in a wide variety of products, including computers, handheld devices, industrial infrastructure, televisions, and vehicles. Many of these integrated circuit devices are application-specific integrated circuit (ASICs) that are designed and manufactured to perform specific tasks or processors, such as central processing units (CPUs) or graphics processing units (GPU). A programmable logic device such as an FPGA, by contrast, may be configured after manufacturing with a variety of different system designs. As such, programmable logic devices may be used for varying tasks and/or workloads based on user-specific designs/configurations. Power efficiency may be a concern with all integrated circuit devices. However, due to the client-specific designs and configurations of the programmable fabric devices, power management techniques may need to be more dynamic than may be readily available for processors or ASICs.

BRIEF DESCRIPTION OF THE DRAWINGS

Various aspects of this disclosure may be better understood upon reading the following detailed description and upon reference to the drawings in which.

Various aspects of this disclosure may be better understood upon reading the following detailed description and upon reference to the drawings in which.

DETAILED DESCRIPTION OF SPECIFIC EMBODIMENTS

Figure 1:
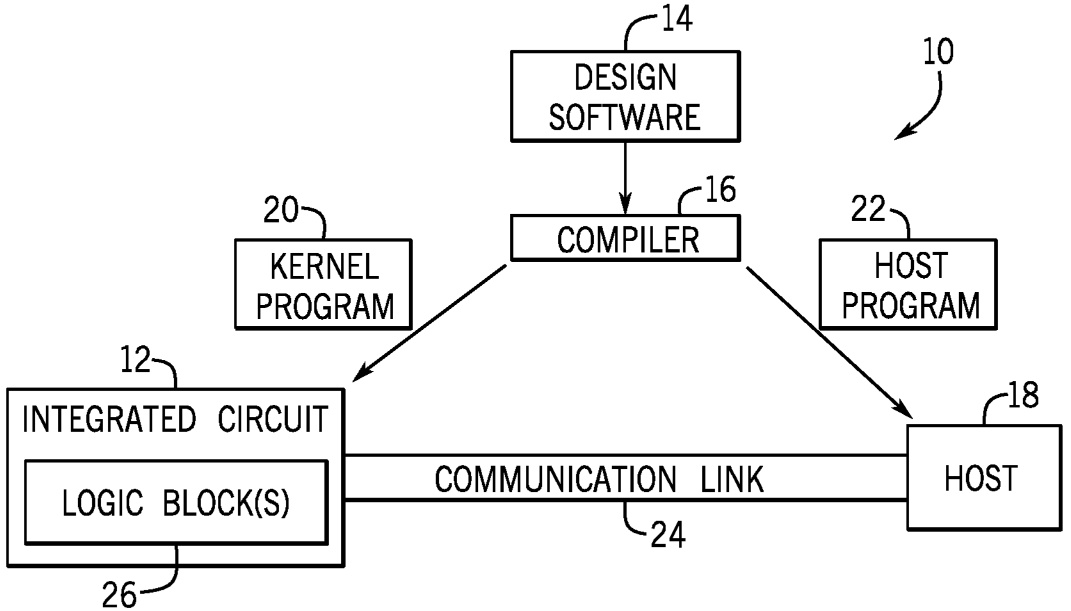
FIG. 1 is a block diagram of a system that may implement logic-based operations using an integrated circuit device, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Semiconductor devices may use load lines to control how the devices operate. For example, a load line may be used to reduce/control thermal design power (TDP). Indeed, a load line is a commonly used method in CPU power delivery to save power and reduce decoupling needs. The load line shows how voltage drops as CPU current draw increases. The load line is set based on a worst case load current target corresponding to a minimum voltage for performance and voltage variation. However, if load is lighter than the worst case scenario, the voltage operates at a higher level providing a reduced power saving percentage. In programmable logic devices the increased power is significant due to the large consumption of power in the programmable logic cores. Furthermore, unlike a CPU, a generic load line for all users/customers using a programmable logic device may not be suitable many or even most users. Specifically, programmable logic devices are increasingly permeating markets and are increasingly enabling customers to implement circuit designs in logic fabric (e.g., programmable logic) due to the large amount of flexibility provided by the programmable logic devices. To provide this flexibility, a programmable logic fabric of an integrated circuit device may be programmed to implement a programmable circuit design to perform a wide range of functions and operations based on different designs or configurations loaded into the programmable fabric. The programmable logic fabric may include configurable blocks of programmable logic (e.g., sometimes referred to as logic array blocks (LABs) or configurable logic blocks (CLBs)) that have lookup tables (LUTs) that can be configured to operate as different logic elements based on the configuration programmed into memory cells in the blocks. However, this flexibility may cause a single load line model to be inappropriate across all of the different possible designs causing some devices to operate inefficiently and/or causing some devices to function improperly (e.g., due to overheating). Instead, custom/dynamic load lines that are specific for the configuration of the programmable logic fabric rather than the generic device may ensure efficient deployment for each customer/user/tenant based on their specific needs. However, changing some aspects (e.g., slope) of the load line may require hardware changes to optimize the load line and power saving for every change of design implemented in the programmable logic fabric, but such changes may be impractical or impossible. Instead, a voltage identifier (VID) may be used to change the voltage to the silicon to guarantee programmable voltage regulation from initial VID values based on the load. In other words, changing the VID setting generates an effective load line that is shifted along a voltage axis without changing the slop, of the initial load line. This provides a simpler and convenient methodology for educing power consumption for lower load scenarios.

With the foregoing in mind, FIG. 1 illustrates a block diagram of a system 10 that may perform operations as described herein. A designer may desire to implement functionality, such as the operations of this disclosure, or an application involving operations on an integrated circuit device 12 having a programmable logic fabric (such as a field programmable gate array (FPGA)). The programmable logic fabric may be implemented on a single die or multiple die arranged in a single package. For instance, multiple die may be arranged in a 2.5D configuration or a stacked 3D configuration. The integrated circuit device 12 may implement a programmable system design to carry out the desired functionality. In some cases, the designer may specify a high-level program, such as an OPENCL® program, which may enable the designer to more efficiently and easily provide programming instructions to configure a set of programmable logic cells for the integrated circuit device 12 without requiring specific knowledge of low-level hardware description languages (e.g., Verilog or VHDL). For example, because OPENCL® is quite similar to other high-level programming languages, such as C++, designers of programmable logic familiar with such programming languages may have a reduced learning curve than designers that may have to learn unfamiliar low-level hardware description languages to implement new functionalities in the integrated circuit device 12.

Designers may implement their high-level designs using design software 14, such as a version of INTEL® QUARTUS® by INTEL CORPORATION. The design software 14 may use a compiler 16 to convert the high-level program into a lower-level description. The design software 14 may also be used to optimize and/or increase efficiency in the design. The compiler 16 may provide machine-readable instructions representative of the high-level program to a host 18 and the integrated circuit device 12. The host 18 may receive a host program 22, which may be implemented by kernel programs 20. To implement the host program 22, the host 18 may communicate instructions from the host program 22 to the integrated circuit device 12 via a communications link 24, which may be, for example, direct memory access (DMA) communications or peripheral component interconnect express (PCIe) communications. In some embodiments, the kernel programs 20 and the host 18 may enable configuration of one or more logic blocks 26 on the integrated circuit device 12. The logic block 26 may include circuitry and/or other logic elements and may be configured to implement arithmetic operations, such as addition and multiplication. The integrated circuit device 12 may include many (e.g., hundreds or thousands) of the logic blocks 26. Additionally, logic blocks 26 may be communicatively coupled to another such that data outputted from one logic block 25 may be provided to other logic blocks 26. The design software 14 and/or the compiler 16 may be implemented using any suitable memory and processor (e.g., CPU). For instance, the design software 14 and/or the compiler 16 may be run on the host 18 and/or any other computing devices suitable for executing design and compiling program applications.

The designer may use the design software 14 to generate and/or to specify a low-level program, such as the low-level hardware description languages described above. Further, in some embodiments, the system may be implemented without a separate host program. Moreover, in some embodiments, the techniques described herein may be implemented in circuitry as a non-programmable circuit design. Thus, embodiments described herein are intended to be illustrative and not limiting.

Figure 2:
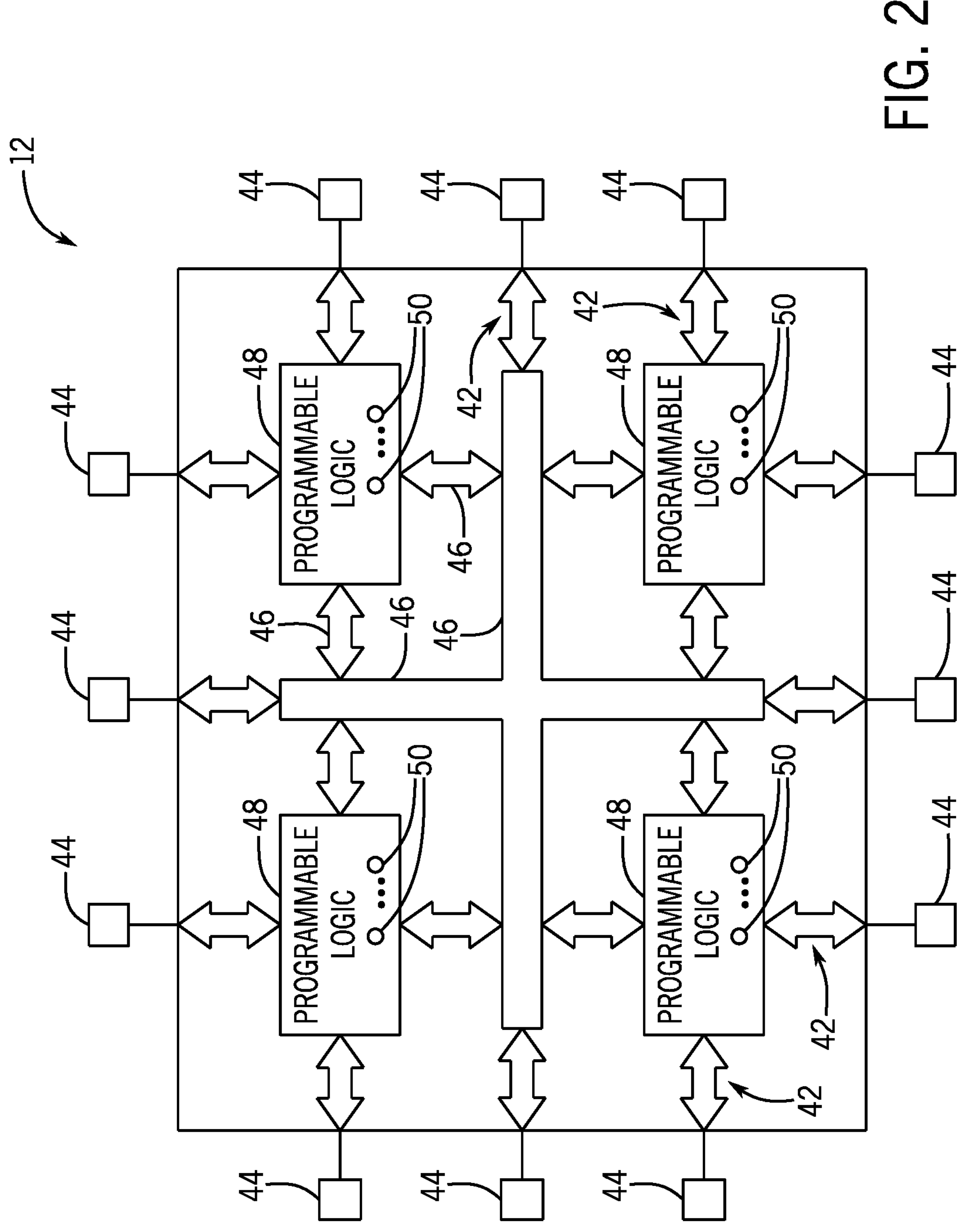
FIG. 2 is a block diagram of the integrated circuit device of FIG. 1, in accordance with an embodiment of the present disclosure.

Turning now to a more detailed discussion of the integrated circuit device 12, FIG. 2 illustrates a block diagram of the integrated circuit device 12 that may be a programmable logic device, such as an FPGA. Further it should be understood that the integrated circuit device 12 may be any other suitable type of programmable logic device (e.g., an application-specific integrated circuit and/or application-specific standard product). Additionally or alternatively, the integrated circuit device 12 may be any suitable integrated circuit device. In certain embodiments, the integrated circuit device 12 may not be a programmable logic device. As shown, the integrated circuit device 12 may have input/output circuitry 42 for driving signals off device and for receiving signals from other devices via input/output pins 44. Interconnection resources 46, such as global and local vertical and horizontal conductive lines and buses, and/or configuration resources (e.g., hardwired couplings, logical couplings not implemented by user logic), may be used to route signals on the integrated circuit device 12. Additionally, interconnection resources 46 may include fixed interconnects (conductive lines) and programmable interconnects (i.e., programmable connections between respective fixed interconnects). Programmable logic 48 may include combinational and sequential logic circuitry. For example, programmable logic 48 may include look-up tables, registers, and multiplexers. In various embodiments, the programmable logic 48 may be configurable to perform a custom logic function. The programmable interconnects associated with interconnection resources may be considered to be a part of programmable logic 48. The programmable logic 48 may include multiple various types of programmable logic 48 of different tiers of programmability. For example, the programmable logic 48 may include various mathematical logic units, such as an arithmetic logic unit (ALU) or configurable logic block (CLB) that may be configurable to perform various mathematical functions (e.g., addition, multiplication, and so forth).

Programmable logic devices, such as integrated circuit device 12, may contain programmable elements 50, such as configuration random-access-memory (CRAM) cells loaded with configuration data during programming and look-up table random-access-memory (LUTRAM) cells that may store either configuration data or user data, within the programmable logic 48. The programmable elements 50

(e.g., CRAM cells) may be used to store one or more registers. For instance, a voltage identifier (VID) register may be allocated to the programmable elements 50 (e.g., CRAM cells) to store a code that corresponds to a voltage offset applied to the silicon of the programmable logic device used to ensure that the silicon meets both performance and power targets.

A designer (e.g., a customer) may (re)program (e.g., (re)configure) the programmable logic 48 to perform one or more desired functions. By way of example, some programmable logic devices may be programmed or reprogrammed by configuring programmable elements 50 using mask programming arrangements, which is performed during semiconductor manufacturing. Other programmable logic devices are configured after semiconductor fabrication operations have been completed, such as by using electrical programming or laser programming to program programmable elements. In general, programmable elements 50 may be based on any suitable programmable technology, such as fuses, antifuses, electrically-programmable read-only-memory technology, random-access memory cells, mask-programmed elements, and so forth.

Figure 3:
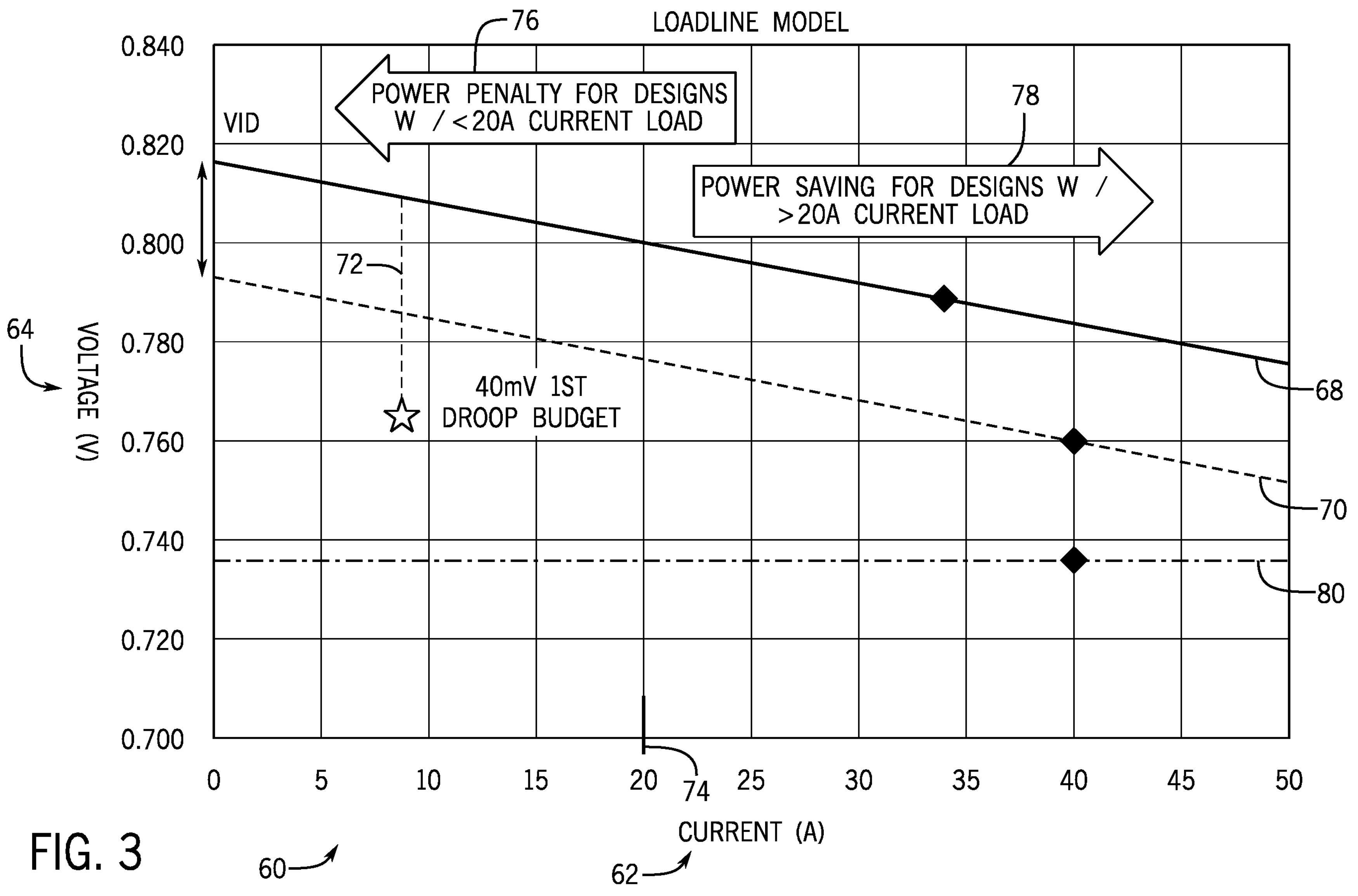
FIG. 3 is a graph of a load line used to control operation of the integrated circuit device of FIG. 2, in accordance with an embodiment of the present disclosure.

FIG. 3 is a graphical representation 60 of a load line model that may be used in operation of the programmable logic device. For instance, the load line model may be used for the TDP of the integrated circuit device 12. As illustrated, the graphical representation 60 has an x-axis 62 and a y-axis 64. The illustrated x-axis 62 corresponds to a current for the integrated circuit device 12, but may be used to represent other operational parameters, such as temperature or other electrical parameters. Furthermore, the current may be an overall current used for the programmable fabric of the integrated circuit device 12 or may be a current for only a portion (e.g., a sector of multiple sectors or a power domain of multiple power domains) of the integrated circuit device 12. The illustrated y-axis 64 corresponds to a voltage of the integrated circuit device 12. Similar to the x-axis 62, the y-axis 64 may be used to represent other operational parameters, such as temperature or other electrical parameters. Furthermore, the voltage may be an overall voltage used for the programmable fabric of the integrated circuit device 12 or may be a voltage for only a portion (e.g., a sector of multiple sectors or a power domain of multiple power domains) of the integrated circuit device 12.

The graphical representation 60 of the load line model also includes a maximum load line 68 and a minimum load line 70. The maximum load line 68 and the minimum load line provide a bound of operation for the integrated circuit device 12. The graphical representation 60 also specify various aspect for operation, such as a Pt droop budget 72 (e.g., 40 mV), a margin or distance between the maximum load line 68 and the minimum load line 70, and/or other details. The load line model is a power distribution network (PDN) design technique to maintain constant impedance based on a worst-case current target. The silicon voltage drops as current consumption increases. The load line model saves power as silicon voltage and resulting current as current increases.

For a given current, a voltage to be used lies between the maximum load line 68 and the minimum load line 70 or vice versa. Furthermore, when the load line is used for a current load less than a current 74 (e.g., 20 Amps), implementations in the region to the left of the current 74 pay a power penalty while designs that are made for a current load greater than the current save power using the load line model. The graphical representation 60 also shows that a minimum voltage 80 may be specified to obtain a minimum speed/performance for the integrated circuit device 12.

As previously discussed, load line modeling may be consistent for a single integrated circuit device when they integrated circuit is a processor or an ASIC. However, a load line-by device is difficult to apply to a programmable logic device (e.g., an FPGA) due to the dynamic nature of the programmable logic device. Specifically, the optimum load line may be different designs may be different even when they may be implemented on the same programmable logic device. Instead, the dynamic load line for a programmable logic device may change by customer/user to increase the efficiency of operating using the different designs.

Figure 4A:
FIG. 4A is a graph of a load line used to control operation of the integrated circuit device of FIG. 2 with a high load voltage range, in accordance with an embodiment of the present disclosure.
Figure 4A:
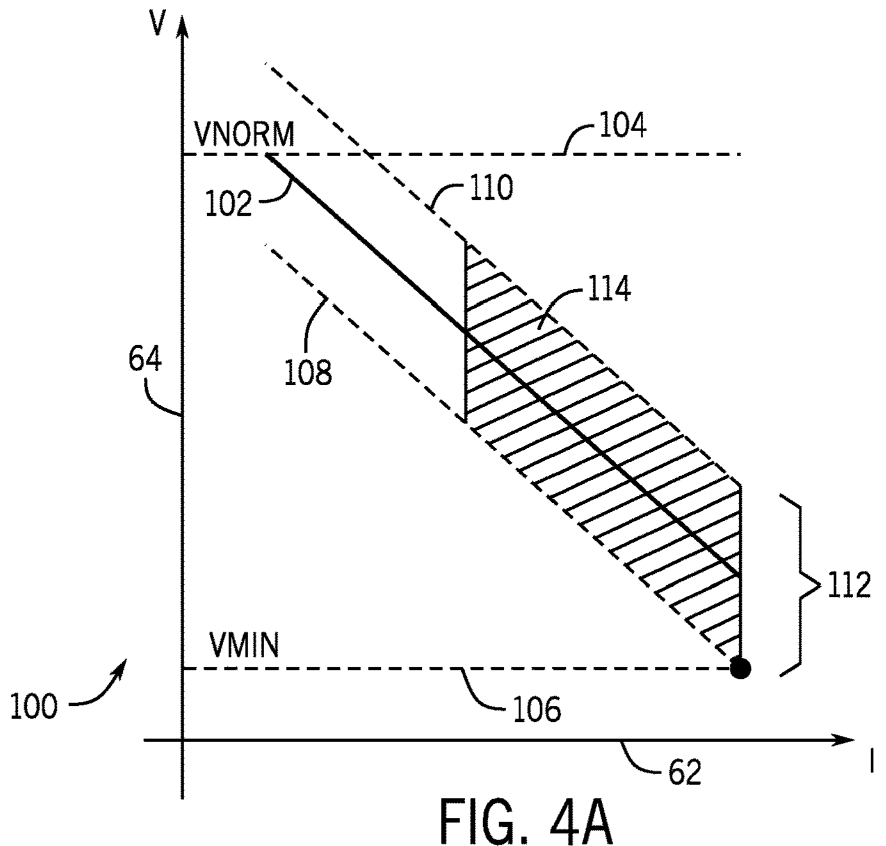
Figure 4B:
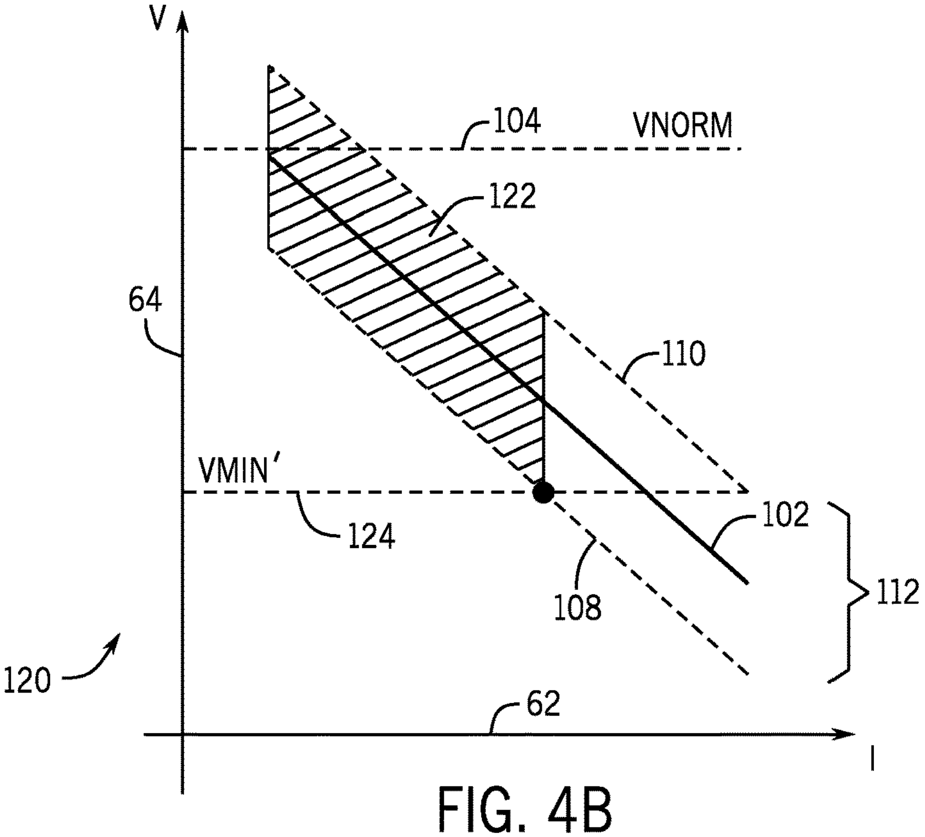
FIG. 4B is a graph of a load line used to control operation of the integrated circuit device of FIG. 2 with a low load voltage range, in accordance with an embodiment of the present disclosure.

One way to create optimal load lines dynamically may be through software modeling. For example, for any given design, the design software 14 may compute a one or more parameters (e.g., maximum current load) based on specified workload and usage conditions for the design. The load line may also be computed by matching a maximum IR drop through the load line with a 1st droop budget and performance minimum voltage (Vmin) specification. However, such computations change the slope of the load line and may be difficult/impractical to implement as some changes may require hardware changes or excess computations. Instead, in such cases, if a normal voltage stays the same, voltage drop at maximum current may be small with a light load for a fixed load line. For instance, FIGS. 4A and 4B, collectively referred to as FIG. 4, show such load line variations. FIG. 4A includes a graph 100 that shows a load line 102 that starts at a normal voltage 104 (e.g., normal/max voltage at low load before IR drop). The load line 102 also corresponds to a minimum voltage (Vmin) 106 set to obtain a minimum performance or speed for the integrated circuit device 12. The load line 102 also has a minimum line 108 and a maximum line 110 that correspond to a voltage variation range 112 around the load line 102 in which the integrated circuit device 12 is permitted to operate. As illustrated, the load line 102 extends from the normal voltage 104 down to a point where the minimum line 108 meets the minimum voltage 106. In other words, the load line 102 ensures that the operating voltage does not drop below the minimum voltage 106 even in worst case scenarios. The graph 100 also shows a voltage range 114 under heavy load.

FIG. 4B includes a graph 120 that shows the load line 102 that starts at the normal voltage 104 (e.g., normal/max voltage at low load before IR drop). The load line 102 also corresponds to a minimum voltage (Vmin') 124 set to obtain a minimum performance or speed for the integrated circuit device 12 at the low load. The minimum voltage 124 is greater than the minimum voltage 106 of FIG. 4A. The load line 102 also has the minimum line 108 and the maximum line 110 that correspond to the voltage variation range 112 around the load line 102 in which the integrated circuit device 12 is permitted to operate. As illustrated, the load line 102 extends from the normal voltage 104 down to a point where the minimum line 108 meets the minimum voltage 124. In other words, the load line 102 ensures that the operating voltage does not drop below the minimum voltage 124 even in worst case scenarios. The graph 100 also shows a voltage range 122 under a light load. There is less savings in the light load condition due to the voltage running higher than may be appropriate for the light load.

In addition or alternative to maintaining the normal voltage 104, the load line may be shifted (e.g., shifted) down along the x-axis by changing the VID to change (e.g., lower) the voltage supplied to the silicon. As discussed below, the programmable logic device may include a VID register in the programmable elements 50 of the programmable logic device that is used to make such changes.

Figure 5:
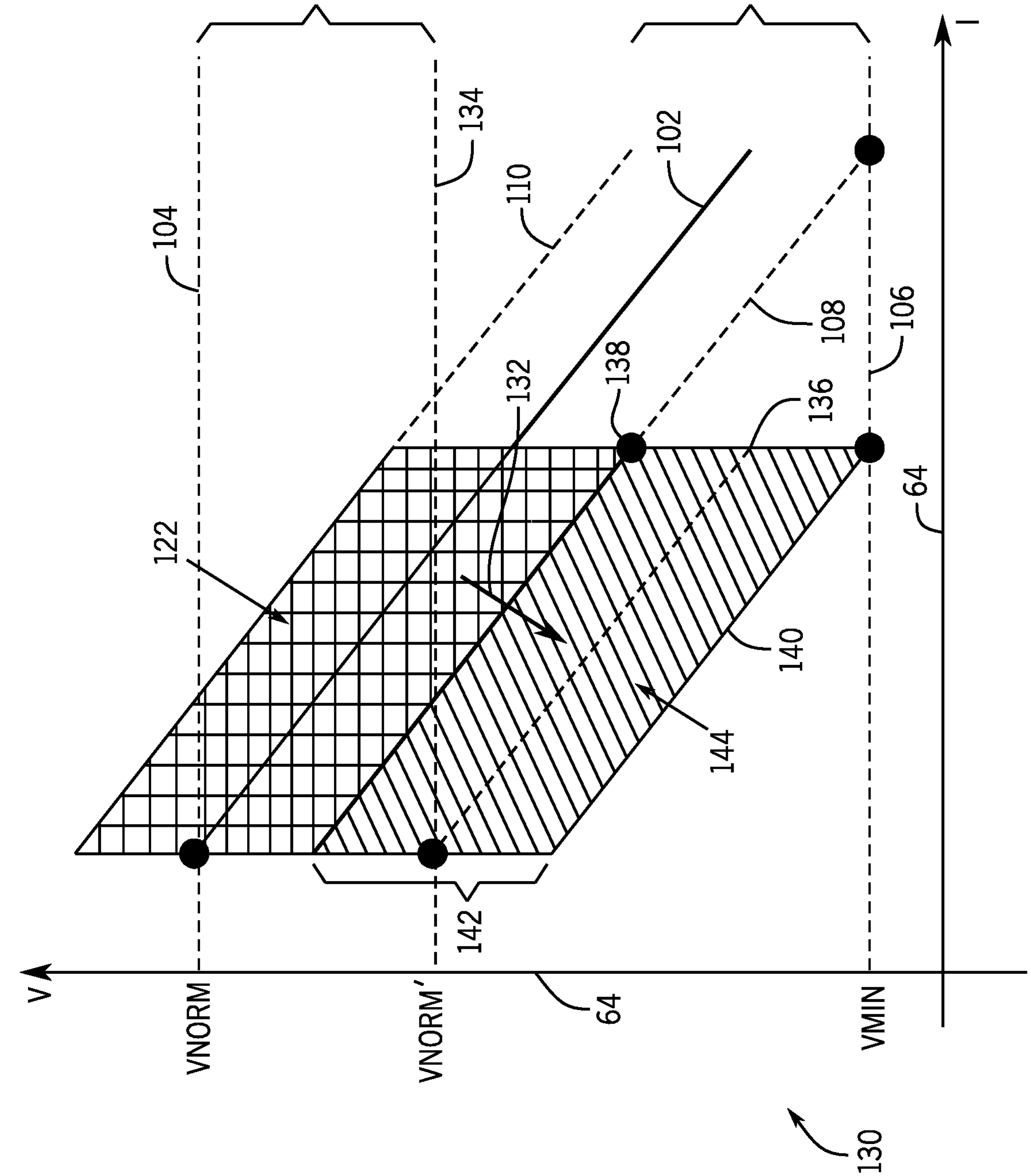
FIG. 5 is a graph of a changing a load line used to control operation of the integrated circuit device of FIG. 2 by changing a voltage identifier (VID) that reduces a supply voltage to the integrated circuit device, in accordance with an embodiment of the present disclosure.

FIG. 5 is a graph 130 showing load line manipulation by changing the normal voltage using VID changes to change the voltage supplied to the silicon of the integrated circuit device 12. As illustrated, the graph 130 shows the load line 102 before the VID adjustment. The graph 130 shows a voltage change 132 due to the VID adjustment. This voltage change 132 causes the normal voltage (Vnorm) 104 to be reduced to an adjusted normal voltage (Vnorm') 134 that is lower than the normal voltage 104. This new adjusted normal voltage 134 enables the integrated circuit device 12 to operate at a lower voltage and use less power at low load using a new effective load line 136. The new effective load line 136 has a maximum line 138

Like the load line 102, the new effective load line 136 also corresponds to the minimum voltage 106 set to obtain a minimum performance or speed for the integrated circuit device 12 at the low load. The new effective load line 136 also has a maximum line 138 and a minimum line 140 that correspond to a voltage variation range 142 around the new effective load line 136 in which the integrated circuit device 12 is permitted to operate. In some embodiments, the voltage variation range 142 is the same magnitude as the voltage variation range 142 while it may be different in some other embodiments. As illustrated, the new effective load line 136 extends from the normal voltage 134 down to a point where the minimum line 140 meets the minimum voltage 106. In other words, the new effective load line 136 ensures that the operating voltage does not drop below the minimum voltage 106 even in worst case scenarios. The graph 100 also shows a voltage range 144 under a light load. Due to the lower normal voltage, the voltage range 144 provides more power savings in the light load condition than the voltage range 122 due to the voltage running lower as may be appropriate for the light load. In the graph 130, the minimum line 108 is the same as the maximum line 138 after the shift. However, this may be true for some embodiments (e.g., when voltage change 132 is the same as the voltage ranges 112 and 142) while not being true for some other embodiments of the present disclosure.

Figure 6:
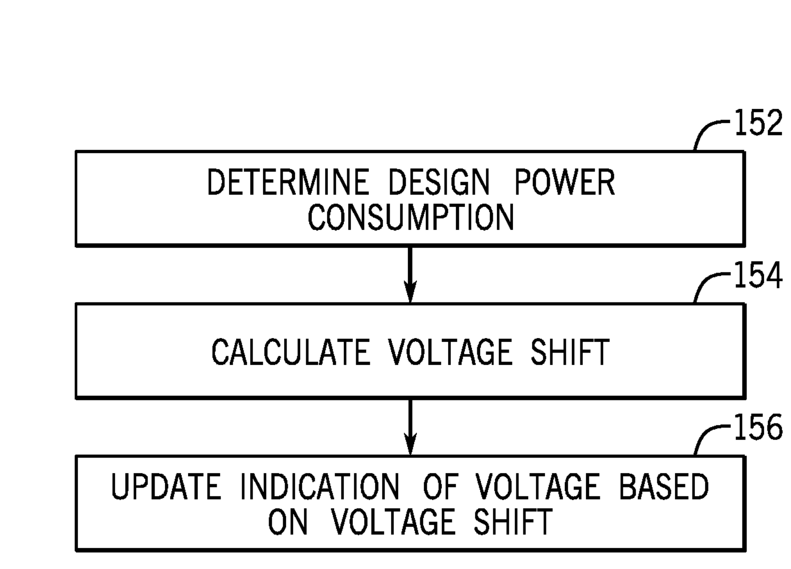
FIG. 6 is a flow diagram of a process used determining and setting a voltage shift to the load line of FIG. 5, in accordance with an embodiment of the present disclosure.
Figure 7:
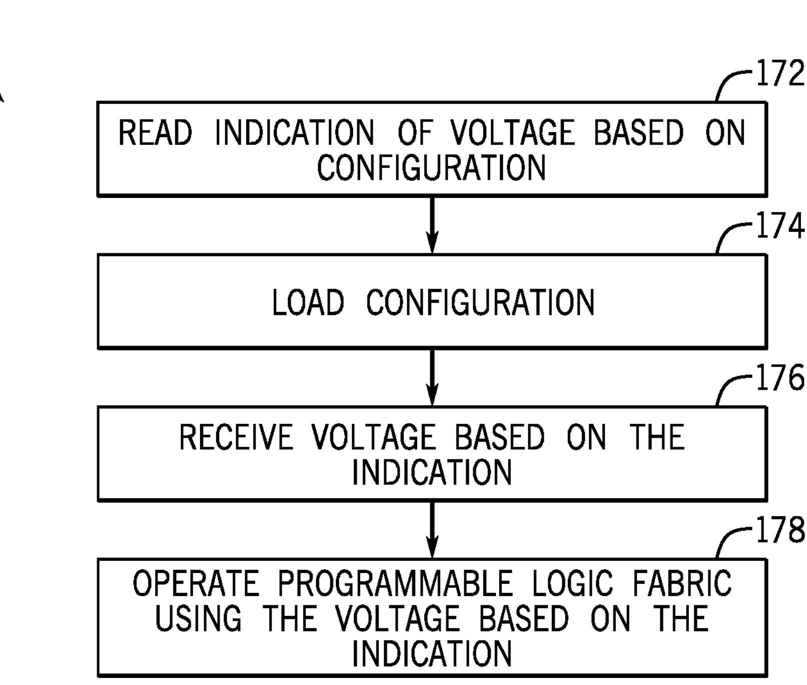
FIG. 7 is a flow diagram of a process for utilizing the shifted voltage of FIG. 6, in accordance with an embodiment of the present disclosure.

FIG. 6 is a flow diagram of a process 150 for changing operation of a programmable logic device. The process 150 may be implemented in hardware, software, or a combination of hardware and software. The process 150 includes determining a design power consumption (block 152). For instance, the design software 14 may be used to design a configuration for the programmable elements 50 that may be loaded and configured for the integrated circuit device 12. Based on this design, a power thermal calculator may determine the power consumption of the design. In some embodiments, the power thermal calculator may be implemented in the design software 14, may be implemented using software separate from the design software 14, and/or may be implemented using hardware. Using the design power consumption, the design software 14 (or other software/hardware) may calculate a voltage shift for the integrated circuit device 12 (block 154). For instance, using the design power consumption from the power thermal calculator, the design software 14 or other component may determine what shift of the voltage to the silicon of the integrated circuit device 12 is to be made to cause the minimum voltage 106 to be maintained when shifting the voltage range 144 downward to cause the minimum line 140 to meet the minimum voltage 106. The amount of voltage shift corresponds to the voltage change 132 of FIG. 5. The design software 14 (or other software/hardware) then causes an indication to be updated based on this amount of voltage shift (block 156). For instance, the design software 14 (or other software/hardware) may write a value to a VID register where the value corresponds to the voltage shift (e.g., voltage change 132), the voltage (e.g., normal voltage 134) resulting from the voltage shift, and/or the actual voltage to be supplied to the silicon of the integrated circuit device 12. In other words, the VID register may store the amount (and direction) of the voltage shift from the unchanged supply voltage to the integrated circuit device 12, may store the magnitude of the voltage independent of an unchanged supply voltage to the integrated circuit device 12, and/or may store the magnitude of the normal voltage 134 that is reduced from the normal voltage 104 after using the voltage shift. This VID register may be used to change the supply voltage that causes the new effective load line 136 to utilize less power than the load line 102 while still maintaining performance even at low loads.

FIG. 6 is a flow diagram of a process 170 for operating the integrated circuit device 12. The integrated circuit device 12 may access and/or read the indication of a voltage that is based on a configuration (block 172). For example, a controller (e.g., device or sector controller) may read the indication of the voltage. The indication may be stored in a VID register to indicate the incoming voltage level. As previously noted, this indication is based on power consumption of the configuration. The integrated circuit device 12 loads the configuration (block 174). The integrated circuit device 12 may load the configuration after receiving the indication, before receiving the indication, or simultaneously with receiving the indication. In certain embodiments, the change of the voltage (via VID register) may be made using a partial reconfiguration that is performed at run time while leaving at a configuration of at least some of the programmable elements of the programmable logic fabric unperturbed. Indeed, the voltage may be configurable with or without changing the configuration using a newly customer picked and/or newly calculated VID by performing a partial reconfiguration.

The integrated circuit device 12 also receives the voltage at the silicon of the integrated circuit device 12 (block 176). For instance, a voltage supply (e.g., via voltage regulators) may change the voltage based on the indication stored in the VID register. The integrated circuit device 12 then operates the programmable logic fabric of the integrated circuit device 12 using the changed (e.g., reduced) voltage using the new effective load line 136.

Figure 8:
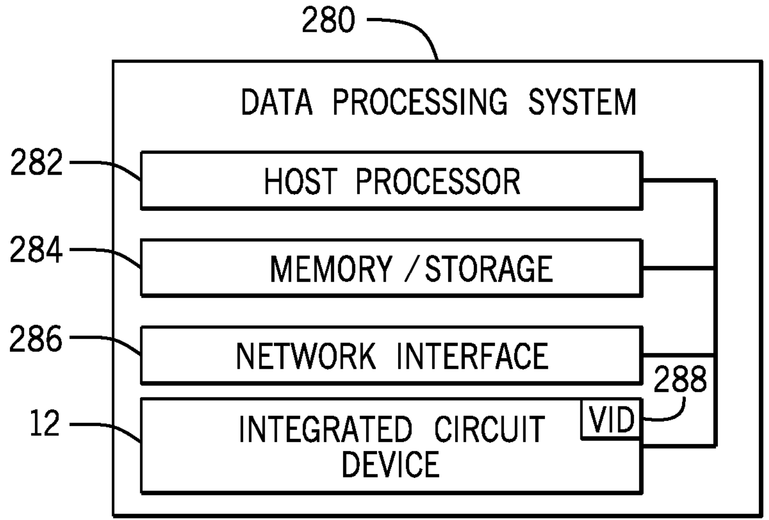
FIG. 8 is a data processing system, in accordance with an embodiment of the present disclosure.

The integrated circuit device 12 may be a data processing system or a component included in a data processing system. For example, the integrated circuit device 12 may be a component of a data processing system 280 shown in FIG. 8. The data processing system 280 may include a host processor 282 (e.g., a central-processing unit (CPU)), memory and/or storage circuitry 284, and a network interface 286. The data processing system 280 may include more or fewer components (e.g., electronic display, user interface structures, application specific integrated circuits (ASICs)). The host processor 282 may include any suitable processor, such as an INTEL® Xeon® processor or a reduced-instruction processor (e.g., a reduced instruction set computer (RISC), an Advanced RISC Machine (ARM) processor) that may manage a data processing request for the data processing system 280 (e.g., to perform debugging, data analysis, encryption, decryption, machine learning, video processing, voice recognition, image recognition, data compression, database search ranking, bioinformatics, network security pattern identification, spatial navigation, or the like). The memory and/or storage circuitry 284 may include random access memory (RAM), read-only memory (ROM), one or more hard drives, flash memory, or the like. The memory and/or storage circuitry 284 may hold data to be processed by the data processing system 280. In some cases, the memory and/or storage circuitry 284 may also store configuration programs (bitstreams) for programming the integrated circuit device 12. Additionally, as previously noted, the integrated circuit device 12 includes a VID register 288 used to store the VID value used to indicate the voltage that will be used to supply to the silicon of the integrated circuit device. The network interface 286 may allow the data processing system 280 to communicate with other electronic devices. The data processing system 280 may include several different packages or may be contained within a single package on a single package substrate.

In one example, the data processing system 280 may be part of a data center that processes a variety of different requests. For instance, the data processing system 280 may receive a data processing request via the network interface 286 to perform acceleration, debugging, error detection, data analysis, encryption, decryption, machine learning, video processing, voice recognition, image recognition, data compression, database search ranking, bioinformatics, network security pattern identification, spatial navigation, digital signal processing, or some other specialized task.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

EXAMPLE EMBODIMENTS

EXAMPLE EMBODIMENT 1. A system comprising: memory storing instructions; a processor, that when executing the instructions, performs operations comprising: implementing design software that is used to design a configuration for a programmable fabric of a programmable logic device, wherein implementing the design software comprises: receiving design configuration details for the configuration; receiving an indication of a power consumption for the configuration; calculating a voltage shift to be applied to a load line for the configuration; updating an indication of a voltage to apply the voltage shift; and causing the programmable logic device to be operated using the load line with the voltage shift.

EXAMPLE EMBODIMENT 2. The system of example embodiment 1, wherein a power thermal calculator determines the power consumption.

EXAMPLE EMBODIMENT 3. The system of example embodiment 2, wherein the processor also implements the power thermal calculator.

EXAMPLE EMBODIMENT 4. The system of example embodiment 2, wherein the power thermal calculator receives design configuration parameters from the design software and determines the power consumption from the configuration parameters.

EXAMPLE EMBODIMENT 5. The system of example embodiment 1, wherein calculating the voltage shift comprises calculating the voltage shift to cause a minimum line of a voltage range corresponding to the load line for the configuration to maintain a minimum voltage for the programmable logic device.

EXAMPLE EMBODIMENT 6. The system of example embodiment 1, wherein the voltage comprises a voltage supplied to silicon of the programmable logic device.

EXAMPLE EMBODIMENT 7. The system of example embodiment 6, wherein the indication comprises a voltage identifier (VID) value that indicates a level for the voltage.

EXAMPLE EMBODIMENT 8. The system of example embodiment 7, wherein updating the indication comprises changing a value stored in a VID register.

EXAMPLE EMBODIMENT 9. The system of example embodiment 1, wherein the programmable logic device comprises a single die.

EXAMPLE EMBODIMENT 10. The system of example embodiment 1, wherein the programmable logic device comprises multiple die in a 2.5D or a stacked 3D configuration.

EXAMPLE EMBODIMENT 11. A method comprising: accessing an indication of a voltage based on a configuration for a programmable logic fabric of an integrated circuit device; loading the configuration into the programmable logic fabric; receiving a voltage based on the indication, wherein a change in the indication causes a change in the voltage that also causes a corresponding change in a maximum voltage of a load line for the integrated circuit device; and operating the integrated circuit device using the voltage based on the indication.

EXAMPLE EMBODIMENT 12. The method of example embodiment 11, wherein the voltage comprises a voltage supplied to silicon of the integrated circuit device.

EXAMPLE EMBODIMENT 13. The method of example embodiment 12, wherein indication comprises a voltage identifier (VID) that specifies the voltage.

EXAMPLE EMBODIMENT 14. The method of example embodiment 13, wherein accessing the indication comprises reading from a VID register of the integrated circuit device.

EXAMPLE EMBODIMENT 15. The method of example embodiment 11, wherein loading the configuration comprises a partial reconfiguration performed during run time of the integrated circuit device that leaves at least some portion of the programmable logic fabric unperturbed.

EXAMPLE EMBODIMENT 16. The method of example embodiment 11, wherein loading the configuration comprises a configuration of the programmable logic fabric.

EXAMPLE EMBODIMENT 17. A tangible, non-transitory, and computer-readable medium having stored thereon instructions, that when executed by a processor, causes the processor to: receive design specifications for a configuration of a programmable logic fabric of an integrated circuit device; determining a power consumption for the configuration; calculate a voltage shift to a voltage supplied to the integrated circuit device applied to a load line for the configuration; and update a voltage identifier (VID) that indicates a level of the voltage to apply the voltage shift during operation of the integrated circuit device.

EXAMPLE EMBODIMENT 18. The tangible, non-transitory, and computer-readable medium of example embodiment 17, wherein the instructions, when executed, cause the processor to execute design software that receives the design specifications and updates the VID.

EXAMPLE EMBODIMENT 19. The tangible, non-transitory, and computer-readable medium of example embodiment 18, wherein the design software includes or utilizes a power thermal calculator.

EXAMPLE EMBODIMENT 20. The tangible, non-transitory, and computer-readable medium of example embodiment 17, wherein updating the VID comprises writing a value to a VID register.

What is claimed is:

1. A system comprising:

memory storing instructions;

a processor, that when executing the instructions, performs operations comprising:

implementing design software that is used to design a configuration for a programmable fabric of a programmable logic device, wherein implementing the design software comprises:

receiving, at the processor, design configuration details for the configuration;

calculating, using the processor, a voltage shift to be applied to a load line model for the configuration, wherein the load line model defines voltage limits for the programmable logic device based on current usage of the programmable logic device;

causing the programmable logic device to be operated using the load line model with the voltage shift.

2. The system of claim 1, wherein a power thermal calculator determines a power consumption.

3. The system of claim 2, wherein the processor also implements the power thermal calculator.

4. The system of claim 2, wherein the power thermal calculator receives design configuration parameters from the design software and determines the power consumption from the configuration parameters.

5. The system of claim 1, wherein calculating the voltage shift comprises calculating the voltage shift to cause a minimum line of a voltage range corresponding to the load line model for the configuration to maintain a minimum voltage for the programmable logic device.

6. The system of claim 1, wherein the voltage comprises a voltage supplied to silicon of the programmable logic device.

7. The system of claim 6, wherein implementing the design software comprises updating a voltage identifier (VID) value that indicates a level for the voltage supplied to the silicon of the programmable logic device.

8. The system of claim 1, wherein the programmable logic device comprises a single die.

9. The system of claim 1, wherein the programmable logic device comprises multiple die in a 2.5D or a stacked 3D configuration.

10. A method comprising:

accessing an indication of a voltage based on a configuration for a programmable logic fabric of an integrated circuit device;

loading the configuration into the programmable logic fabric;

receiving a voltage based on the indication, wherein a change in the indication causes a change in the voltage that also causes a corresponding change in a maximum voltage of a load line model for the integrated circuit device, wherein the load line model defines voltage limits for the programmable logic fabric based on current usage of the integrated circuit device; and operating the integrated circuit device using the voltage based on the indication.

11. The method of claim 10, wherein the voltage comprises a voltage supplied to silicon of the integrated circuit device.

12. The method of claim 11, wherein the indication comprises a voltage identifier (VID) that specifies the voltage.

13. The method of claim 12, wherein accessing the indication comprises reading from a VID register of the integrated circuit device.

14. The method of claim 10, wherein loading the configuration comprises a partial reconfiguration performed during run time of the integrated circuit device that leaves at least some portion of the programmable logic fabric unperturbed.

15. The method of claim 10, wherein loading the configuration comprises a configuration of the programmable logic fabric.

16. A tangible, non-transitory, and computer-readable medium having stored thereon instructions, that when executed by a processor, causes the processor to:

receive design specifications for a configuration of a programmable logic fabric of an integrated circuit device;

determine a power consumption for the configuration from the design specifications;

calculate a voltage shift to a voltage to be supplied to the integrated circuit device applied to a load line model for the configuration, wherein the load line model defines voltage limits for the integrated circuit device based on current usage of the integrated circuit device; and update a voltage identifier (VID) that indicates a level of the voltage to apply the voltage shift during operation of the integrated circuit device.

17. The tangible, non-transitory, and computer-readable medium of claim 16, wherein the instructions, when executed, cause the processor to execute design software that receives the design specifications and updates the VID.

18. The tangible, non-transitory, and computer-readable medium of claim 17, wherein the design software includes or utilizes a power thermal calculator.

19. The tangible, non-transitory, and computer-readable medium of claim 16, wherein updating the VID comprises writing a value to a VID register.

* * * * *